United States Patent
Wolf et al.

(10) Patent No.: US 11,472,415 B2
(45) Date of Patent: Oct. 18, 2022

(54) ARRANGEMENT AND METHOD FOR DETERMINING A GRADIENT SIGNAL IN A VEHICLE

(71) Applicant: ZF Friedrichshafen AG, Friedrichshafen (DE)

(72) Inventors: Daniel Wolf, Friedrichshafen (DE); Markus Birk, Friedrichshafen (DE); Mauro Cesar Zanella, Freidrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 554 days.

(21) Appl. No.: 16/493,763

(22) PCT Filed: Feb. 7, 2018

(86) PCT No.: PCT/EP2018/053020
§ 371 (c)(1),
(2) Date: Sep. 13, 2019

(87) PCT Pub. No.: WO2018/166718
PCT Pub. Date: Sep. 20, 2018

(65) Prior Publication Data
US 2020/0132844 A1    Apr. 30, 2020

(30) Foreign Application Priority Data

Mar. 15, 2017  (DE) .................... 10 2017 204 306.7

(51) Int. Cl.
*G01S 17/42* (2006.01)
*B60W 40/076* (2012.01)
(Continued)

(52) U.S. Cl.
CPC .......... *B60W 40/076* (2013.01); *G01S 17/42* (2013.01); *G01S 17/931* (2020.01); *B60W 2420/62* (2013.01); *G01S 17/89* (2013.01)

(58) Field of Classification Search
CPC ..... B60W 40/076; G01S 17/931; G01S 17/42
See application file for complete search history.

(56) References Cited

U.S. PATENT DOCUMENTS 9,832,432 B2 * 11/2017 Tsubaki ............. H04N 5/23264
10,093,312 B2 * 10/2018 Kuroda .................. G01S 17/42
(Continued)

FOREIGN PATENT DOCUMENTS

DE    102007037162 A1    2/2009
DE    102016110461 A1    12/2017
(Continued)

*Primary Examiner* — Bryan Bui
(74) *Attorney, Agent, or Firm* — Leydig, Voit & Mayer, Ltd.

(57) ABSTRACT

An arrangement determines a gradient signal in a vehicle. The arrangement has: a position capture device that determines a vehicle position at a first and second time and ascertains therefrom a distance traveled as a motion vector, and a laser distance sensor on the vehicle front at an angle to a vehicle longitudinal axis and configured to emit a laser beam in a direction of a first measuring point in front of the vehicle at the first and second time, and a length sensor to ascertain the length of the laser beam and its associated vector at the first and second time, and at least one detection device to ascertain a differential vector from the motion vector and the ascertained vectors and to form a gradient signal therefrom.

10 Claims, 2 Drawing Sheets

(51) Int. Cl.
*G01S 17/931* (2020.01)
*G01S 17/89* (2020.01)

(56) References Cited

U.S. PATENT DOCUMENTS

| | | |
|---|---|---|
| 2010/0030473 A1 | 2/2010 | Au et al. |
| 2011/0260033 A1 | 10/2011 | Steffensen et al. |
| 2014/0207411 A1* | 7/2014 | Laurent .................. G01B 11/26 |
| | | 702/158 |
| 2015/0120244 A1 | 4/2015 | Ma et al. |
| 2015/0336546 A1 | 11/2015 | Al-Zahrani |
| 2015/0355328 A1 | 12/2015 | Maryfield et al. |
| 2016/0076228 A1 | 3/2016 | Nau |
| 2016/0128783 A1 | 5/2016 | Hladio et al. |

FOREIGN PATENT DOCUMENTS

| | | |
|---|---|---|
| EP | 2910512 B1 | 8/2015 |
| JP | H 07229728 A | 8/1995 |
| KR | 20130057115 A | 5/2013 |
| KR | 1020150053000 A | 5/2015 |
| WO | WO 2014070448 A1 | 5/2014 |

\* cited by examiner

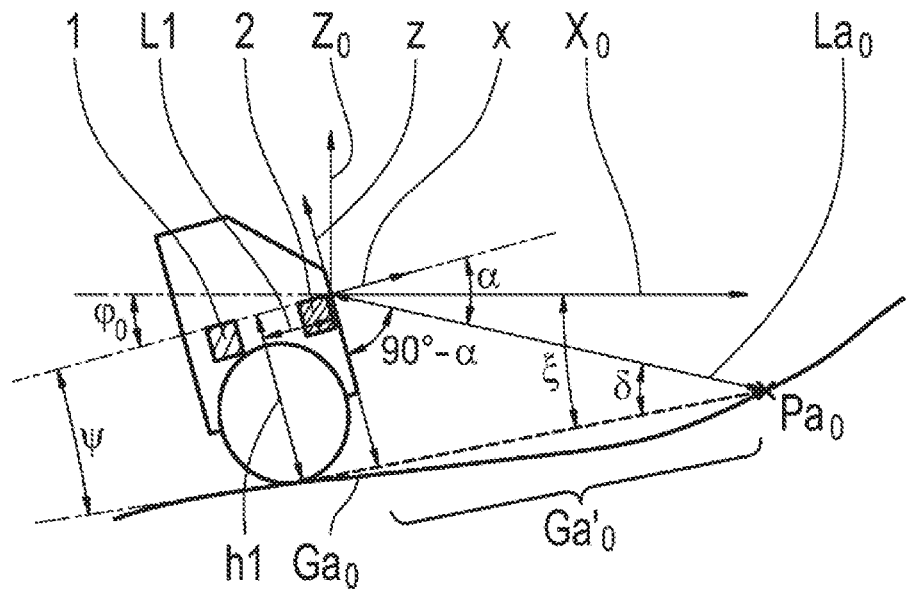
Prior art  Fig. 1
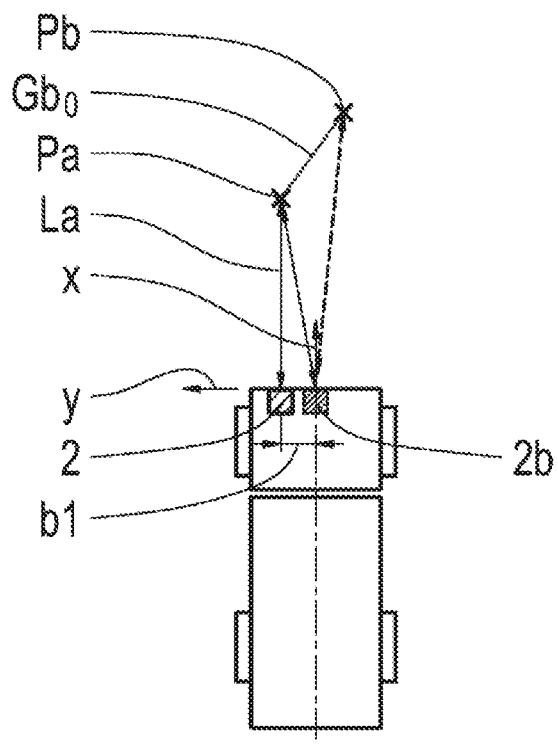
Fig. 3
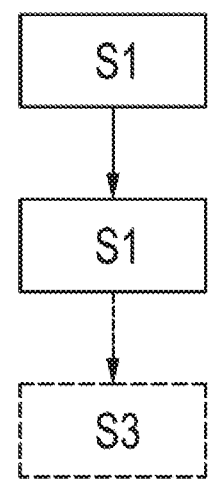
Fig. 4

ARRANGEMENT AND METHOD FOR DETERMINING A GRADIENT SIGNAL IN A VEHICLE

CROSS-REFERENCE TO PRIOR APPLICATIONS

This application is a U.S. National Stage Application under 35 U.S.C. § 371 of International Application No. PCT/EP2018/053020 filed on Feb. 7, 2018, and claims benefit to German Patent Application No. DE 10 2017 204 306.7, filed on Mar. 15, 2017. The International Application was published in German on Sep. 20, 2018 as WO 2018/166718 A1 under PCT Article 21(2).

FIELD

The present invention relates to an arrangement for determining a gradient signal in a vehicle, and to a corresponding method.

BACKGROUND

Various methods are known for measuring inclinations in a wide variety of branches of industry. Sensor devices and structures for determining angles with a measurement and use of markers and/or reflectors on the object to be measured are disclosed, for example in European patent EP 2 910 512 B1 and US patent application US 2011/260 033 A or US patent application US 2016/128 783 A. An angle determination via a laser scanner is disclosed, for example, in US patent application US 2016/076 228 A. Further, angles can be determined by two measurements with a laser distance meter.

Such digital or analog inclinometers determine the angle only at the position of the sensor or by several measurements of the gradients of a traveled distance, a linear laser scan and subsequent evaluation, or by reflectors on fixed objects. Optical methods, i.e., for example, image evaluation methods, are also known for this purpose.

For inclination determination in moving reference systems, fixed markings cannot be used since the terrain to be measured is unknown. In addition, a time-offset measurement must be carried out. According to the known disclosures, only a very complex method from German patent application DE 10 2007 037 162 A1 has hitherto been known for moving reference systems, i.e. also those that are subjected to displacement, such as, for example, in vehicles, in which method measuring information is recorded which contains at least the measuring points scanned with the laser scanner and the position of the laser scanner associated with the respective measuring points, with reference to trigger times predetermined by the laser scanner as well as times predetermined in a time standard.

SUMMARY

An embodiment of the present invention provides an arrangement that determines a gradient signal in a vehicle. The arrangement has: at least one position capture device which is configured to determine a position of the vehicle in an absolute system at least at a first point in time and at a second point in time and to ascertain therefrom a distance traveled of the vehicle as a motion vector, and at least one first laser distance sensor arranged on a front side of the vehicle at a predetermined angle to a vehicle longitudinal axis and configured to emit at least one first laser beam in a direction of a first measuring point in front of the vehicle at least at the first point in time and the second point in time, and at least one laser beam length sensor that is configured to ascertain the length of the at least one laser beam and at least one associated vector of the laser beam at each of the at least first point in time and second point in time, and at least one detection device that is set up to ascertain a differential vector from the motion vector and each of the ascertained vectors of the laser beam and to form a gradient signal therefrom.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a representation of a steady-state calculation of the gradient of a terrain in accordance with the prior art;

FIG. 3 shows a plan view of a vehicle according to FIG. 1 according to an embodiment of the present invention; and FIG. 4 shows a flow diagram of the method according to an embodiment of the present invention.

DETAILED DESCRIPTION

Figure 2:
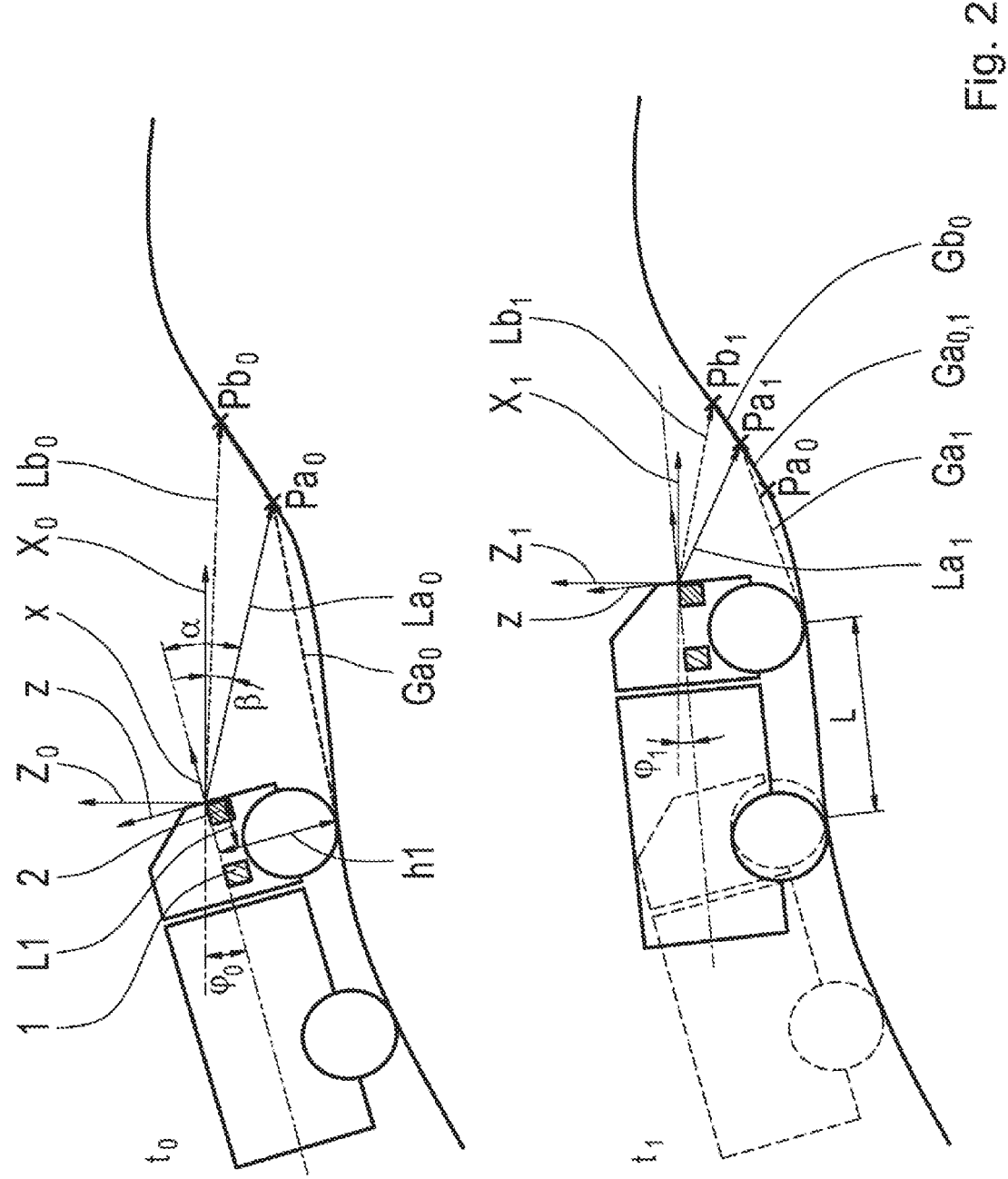
FIG. 2 shows a representation of a vehicle for laser distance measurement for determining a roadway inclination in the preview region at two different points in time, in accordance with an embodiment of the present invention.

The inventors have recognized that no method is known so far in which the gradient angle of the terrain in the preview region of a vehicle, i.e. in a moving reference system, can be ascertained dynamically in a simple manner and without the use of a laser scanner. A laser scanner is used for three-dimensional scanning of an object surface by a laser beam in a defined angle raster. Thus, object surfaces with high dot density can be scanned.

Embodiments of the present invention provide an arrangement and a method, which enable such a determination without laser scanners.

An arrangement for determining a gradient signal in a vehicle is provided by an embodiment, the arrangement having at least one position capture device which is set up to determine the position of the vehicle in an absolute system at least at a first point in time and at a second point in time, and therefrom to ascertain the distance traveled by the vehicle as a motion vector. Further, the arrangement has at least one first laser distance sensor arranged on a front side of the vehicle at a predetermined angle to the vehicle longitudinal axis that is set up to emit at least one first laser beam in the direction of a first measuring point in front of the vehicle at least at the first and the second point in time, and at least one means that is set up to ascertain the length of the at least one laser beam (laser beam length sensor) and at least one associated vector of the laser beam at each of the at least first and second point in time, and at least one determination device which is set up to ascertain a differential vector from the motion vector and each of the ascertained vectors of the laser beam and to form a gradient signal therefrom.

The proposed arrangement makes it possible to determine inclination data in a moving reference system in a simple and cost-effective and dynamic manner without the use of a laser scanner.

In one embodiment, the first laser distance sensor emits two laser beams spread in the vehicle longitudinal axis and the vehicle transverse direction at least at the first and the second point in time in such a way that one of the spread laser beams is the first laser beam and is emitted in the direction of the first measuring point, and the second of the spread laser beams is emitted in the direction of a further measuring point remote from the first measuring point.

In one embodiment, the two laser beams are emitted by sequential switching, including rotating the laser distance sensor or switching the optical unit of the laser distance sensor.

In one embodiment, the arrangement has a second laser distance sensor arranged on a front side of the vehicle at a predetermined angle to the vehicle longitudinal axis that is set up to direct a second laser beam at a second measuring point in front of the vehicle at at least the first and the second point in time, wherein the at least one means is further set up to ascertain the length of the laser beam of both laser distance sensors and at least one associated vector of the laser beams, respectively, and wherein the at least one determination device is further set up to ascertain a differential vector from the motion vector and the ascertained vectors of the laser beams and to form the gradient signal therefrom.

By using more than one laser beam or even more than one laser distance sensor, a higher accuracy in the measurement is achieved.

In one embodiment, the first and the second laser distance sensors are arranged next to one another in the transverse direction of the vehicle. A transverse inclination of the roadway can also be detected by the arrangement next to one another.

In one embodiment, the arrangement further has a further processing device, which is set up to further process the gradient signal, wherein the further processing is carried out by sending the gradient signal to a control device present in the vehicle, which is set up to further process the gradient signal and to carry out an adaptation of the dynamic parameters based on the received and processed gradient signal. In an alternative embodiment, the arrangement further has a further processing device which is set up to further process the gradient signal, wherein the further processing is carried out by sending the gradient signal to an external processing device, which is set up to further process the gradient signal into control signals and to transmit back to the further processing device in the vehicle in order to carry out the adaptation of the dynamic parameters of the vehicle.

By a further processing and/or the provision of the results, both the ego vehicle and other vehicles can benefit from the information, i.e. the ascertained gradient signal. The data and results can be used for further processing to optimize vehicle parameters for the gradient or inclination, either via internal or external equipment. There is also a benefit in that information can be exchanged between vehicles as raw data for further processing, so that a predictive strategy can be planned. Data can also be exchanged as already processed data which predetermine a setting of dynamic parameters. This allows a fast and predictive adaptation to the gradient or inclination of the terrain. Vehicles that cannot make their own calculations can also benefit from this information. Thus, wear, for example of brakes, can be reduced, and fuel can also be saved.

A method for determining a gradient signal in a vehicle is further provided, including the steps of determining the position of the vehicle in an absolute system at least at a first point in time and at a second point in time and, from this, ascertaining the distance traveled as a motion vector as a first step and as a second step determining a differential vector from the motion vector and the vectors of the laser beam ascertained at the first and the second point in time of at least one first laser distance sensor arranged on a front side of the vehicle at a predetermined angle to the vehicle longitudinal axis, which laser distance sensor emits at least one first laser beam in the direction of a first measuring point in front of the vehicle at least at the first and the second point in time, and ascertaining a gradient signal therefrom.

In one embodiment, further processing of the ascertained gradient signal takes place in a third step.

In one embodiment, the further processing is carried out by internal calculation of a control signal for adapting the dynamic parameters of the vehicle and performing the adaptation, or by sending the gradient signal for the external processing and receiving of at least one control signal ascertained from the gradient signal for adapting the dynamic parameters of the vehicle, and performing the adaptation.

In one embodiment, the further processed gradient signal and/or the control signal are used to digitize the terrain and/or are provided to other vehicles.

Other features and advantages of the invention will become apparent from the following description of exemplary embodiments of the invention with reference to the figures in the drawing, which show details according to the invention, and from the claims. The individual features can be implemented individually or as several in any combination in a variant of the invention.

Preferred embodiments of the invention are explained in more detail below with reference to the attached drawings.

In the following descriptions of the figures, identical elements or functions are provided with the same reference signs.

The indices 0 and 1 used in the figures denote the point in time $t=0$ or $t=1$, respectively, at which the respective parameters, e.g. La, Lb, Pa, Pb, Ga or $\varphi$, are determined or measured.

FIG. 1 represents the steady-state calculation of the gradient or inclination of a terrain in accordance with the prior art. This calculation will be explained in more detail within the scope of the description of the invention, as it serves as a basis for determining the inclination in the present invention.

Referring to FIGS. 2 and 3, both the configuration of the arrangement and the method for determining the inclination in accordance with one embodiment will be described hereinafter, here the determination of the inclination of a terrain for a vehicle. Based on this determination, further processing can be carried out to optimize different parameters, especially parameters of longitudinal, vertical and transverse dynamics.

A moving reference system is a reference system which is not an inertial system, i.e. it is subject, inter alia, to accelerations and displacements.

The arrangement for determining a terrain or road inclination in a preview region of a vehicle (moving reference system) consists of at least one spot-measuring laser distance sensor 2 and an inclinometer 1, which can be configured as an angle sensor, preferably as a digital angle sensor. These are arranged in or on the vehicle, wherein the angle sensor outputs the angle ($\varphi$) of the vehicle, more precisely its longitudinal axis, relative to a geostationary, that is to say grounded, inertial or absolute system. In FIG. 1 and FIG. 2, upper image, this angle is denoted as $\varphi_0$, i.e. that this is the angle $\varphi$ at the point in time to. In FIG. 2, lower image, this angle is denoted as $\varphi_1$, i.e. that this is the angle $\varphi$ at the point in time $t_1$.

The laser distance sensor 2 is in a geometrically known position, which is determined from the parameters L1, h1 and b1 denoted in FIG. 2, upper image, and FIG. 3. L1 denotes the distance (in the X direction) between the inclinometer or angle sensor 1 and the laser distance sensor 2; h1 denotes the height (in the Z direction) between the vehicle longitudinal axis X at the height of the laser distance sensor 2 and the terrain, wherein the straight line of the height h1 forms a 90° angle with the longitudinal axis of the vehicle, i.e. is perpendicular thereto b1 denotes the distance of the laser distance sensor 2 (in the Y direction) to the vehicle longitudinal axis (X direction) or, as shown in FIG. 3, the distance of the laser distance sensor 2 (in the Y direction) to an optional second laser distance sensor 2b. The laser distance sensor 2 should preferably be arranged on the front vehicle region with a free field of view in the preview region of the vehicle and be inclined by an angle of inclination a relative to the vehicle longitudinal axis X in the direction of the roadway or terrain, as shown in FIGS. 1 and 2.

As shown in FIG. 1, from the geometrically known position L1, h1, b1, $\alpha$ of the laser distance sensor 2 in the vehicle and the measured length $La_0$ of the beam of the laser distance sensor 2 between the laser distance sensor 2 (i.e., the origin of the beam) and a measuring point Pa on the terrain (for this purpose the point in time t=0), the gradient or angle $\xi$ or $\psi$, respectively, of the straight line Ga approximated to the terrain relative to the vehicle-fixed reference system X, Y, Z can be determined. By conversion with the angle signal of the inclinometer 1, the angle of the gradient in the absolute system is calculated, for example, according to a method from the prior art, e.g., the method proposed in US 2015/355 328 A. Gravity can be used as the measuring principle of the inclinometer 1 for determining the angle relative to the absolute system, e.g. an acceleration sensor cluster, which determines the angle deviation from the deviation or the influence of the gravitational acceleration, or a gyroscope or another known principle, such as a water balance, etc., can be used.

The angle indicates the absolute inclination and can be ascertained from the angle $\varphi$ of the vehicle, more precisely its longitudinal axis, relative to a geostationary, thus earth-fixed, inertial or absolute system as well as the inclination angle $\alpha$ relative to the vehicle longitudinal axis X and the angle $\delta$ shown in FIG. 1, i.e. the angle between the straight line Ga and the laser beam La. The angle $\psi$ indicates the relative inclination and can be ascertained from the difference of the inclination angle $\alpha$ in relation to the vehicle longitudinal axis X and the angle $\delta$ shown in FIG. 1, i.e. the angle between the straight line Ga and the laser beam La.

It can thus be seen from FIG. 1 that the absolute inclination can be calculated as follows:

$$\xi = \varphi + (\alpha - \delta) \quad (1)$$

It can also be seen from FIG. 1 that the relative inclination can be calculated as follows:

$$\psi = \alpha - \delta \quad (2),$$

wherein from the trigonometry, i.e. from the respectively formed triangles for determining the angle:

$$h1/\sin(\delta) = ha/\sin(90° - \alpha), \quad (3),$$

wherein $$Ga = \sqrt{h1^2 + La^2 - 2 \cdot h1 \cdot La \cdot \cos(90° - \alpha)} \quad (4).$$

The method according to the invention now provides a dynamic calculation between two discrete time steps, e.g. t=0 and t=1.

In a first step S1, the position of the vehicle in the absolute system or the traveled distance L of the vehicle and therefrom the corresponding motion vector $Ga_0$, $Ga_1$ is determined at each of the points in time t=0 and t=1. In this case, $Ga_0$, $Ga_1$ is in each case a straight line approximated to the terrain, as already described. This determination can be made by means of GPS or an inclinometer 1 or other methods.

When determining by means of GPS, the inclinometer 1 can be omitted, since the coordinates X, Y, Z in the absolute system for the points in time t=0 and t=1 are known from the GPS position, and the traveled distance L of the vehicle can be determined vectorially, i.e. a motion vector is determined. As a result, the driven slope, which is the current slope in the case of sufficiently small time steps, is also known, as a result of which the inclinometer 1 can be omitted for areas or applications with good GPS signal coverage.

Alternatively, the traveled distance L or the motion vector can also be ascertained from the travel speed or known or detected wheel or output rotational speeds, wherein the vectorial orientation in the vehicle X-Z plane is known from an existing inclinometer 1.

In a second step S2, the differential vector $Ga_{0,1}$ is determined from the now known motion vector $Ga_0$, $Ga_1$ and the vectors of the laser beam, i.e. length La and angle $\alpha$, at the points in time t=0 and t=1. This approximates the gradient of the terrain much better than the vector Ga for small time steps, as shown in FIG. 2, lower image.

In an alternative embodiment, a second laser distance sensor 2b is provided which is inclined at an angle $\alpha$-$\beta$ relative to the vehicle longitudinal axis X in the direction of the roadway or the terrain. The beams La and Lb of the two laser distance sensors 2 and 2b include the angle $\beta$. Due to the different inclination angles of the two laser distance sensors 2 and 2b, the measuring points Pa and Pb on the terrain, which the respective laser beam La or Lb contacts, are spaced apart from one another. The two vectors, i.e. length and angle, of the laser beams La and Lb are thus also known at any point in time, and the differential vector $Ga_{0,1}$, i.e. the terrain gradient, can be calculated at each time step t=0, t=1, etc. and also at standstill.

The two laser distance sensors 2 and 2b are advantageously arranged next to one another on the front side of the vehicle and with a free view into the preview region. The terrain vector $Gb_0$ advantageously runs diagonally over the roadway in the preview region, as shown in FIG. 3, because in this way the gradients along and across the direction of travel can be determined from the vector components. To detect the transverse inclination, the two laser distance sensors 2 and 2b are advantageously provided over the vehicle width, i.e. in the Y direction. Here, the inclinometer 1 or the corresponding device for detecting the absolute position of the vehicle, as described above, is the same for both.

If a single laser distance sensor 2 is used, it is advantageously arranged centrally on the front side of the vehicle;

a pairwise arrangement of two laser distance sensors 2 and 2b is advantageously configured symmetrically.

The transverse inclination of the roadway can also be measured by a single centrally arranged laser distance sensor 2, which emits two measuring beams, referred to as sensor-internal duplication. These are spread in the X-Y plane of the vehicle, i.e. they have an angle to the vehicle longitudinal axis X, as can be seen in FIG. 3 as an angle between the arrows to the measuring points Pa and Pb.

Instead of duplicating the laser distance sensor, sequential switching is also possible. Switching can be effected by rotating the sensor or switching the optical unit, i.e., for example, the prism. The switchover can take place over the roadway width or have different preview lengths as a function of the travel speed.

The laser distance sensor(s) are advantageously arranged in the vehicle interior behind the windshield in a region, which is cleaned by the windshield wiper. Integration in the headlight, in particular when a plastic glazing is present, is also particularly suitable. By means of a connection with the adjustment device for curved light and level control, a correct alignment can be ensured even with alternating loading, so that the preview region can be concentrated in curves on the relevant region.

The wavelength of the laser light is advantageously in the non-visible range, i.e. in the infrared range IR or in the ultraviolet range UV.

In a further step S3, the ascertained gradient signal or the ascertained inclination data can be further used or further processed.

For example, the vehicle parameters, in particular the dynamic parameters, can now be adapted based on the ascertained inclination data or the ascertained gradient signal. The gradient ascertained in this way can thus be used for controlling the longitudinal dynamics, i.e., for example, engine management, shifting strategy, traction management, energy management, etc. For example, the gearbox downshifts in time before the gradient, all-wheel and differential locks are engaged and disengaged in time, wear-free brakes (retarders) are optimally controlled when driving downhill, and the slip control during starting (ASR) and braking (ABS) is optimized. With regard to vertical dynamics (lifting, pitching, rolling) and transverse dynamics of a vehicle, the current and predictive gradient signal can be used for improved control.

Furthermore, there is the possibility of digitizing the terrain and remotely transmitting these ascertained data. The data of a plurality of vehicles is advantageously stored centrally in a server, for example in a cloud environment, and compared with map data. In addition, vehicle dynamics settings for longitudinal, vertical and transverse dynamics can be optimized online or offline and provided in a timely or predictive manner to the vehicle or other vehicles, if they have corresponding communication possibilities, so that the optimum parameters are already set when the vehicle drives the preview region.

The advantage of using laser distance sensors is that they are cheaper by approximately a factor of 5-10 compared to laser scanners, very compact, robust and available with sufficient accuracy. By means of the proposed method and the corresponding arrangement, these advantages can be used and additionally a system and method which is very accurate can be provided.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Position capture device
2 Laser distance sensor
2b Optional/second laser distance sensor
L1 Distance of angle sensor to laser distance sensor in the X direction
h1 Distance/height of vehicle longitudinal axis to terrain in the Z direction
b1 Distance of laser distance sensor to vehicle longitudinal axis in the Y direction
φ Angle of the vehicle (longitudinal axis X) relative to a geostationary inertial or absolute system
α Angle of inclination relative to vehicle longitudinal axis X
Ga, Gb Motion vector (straight line approximated to terrain)
δ Angle between the straight line Ga and the laser beam La
La, Lb Beam and length of laser distance sensors
L Traveled distance
Pa, Pa Measuring point on terrain
ξ Absolute inclination, angle of the straight line Ga/Gb approximated to the terrain relative to the vehicle-fixed reference system X, Y, Z
ψ Relative inclination

The invention claimed is:

1. An arrangement for determining a gradient signal in a vehicle, the arrangement comprising:
at least one position capture device which is configured to determine a position of the vehicle in an absolute system at least at a first point in time and at a second point in time and to ascertain therefrom a distance traveled of the vehicle as a motion vector, and
at least one first laser distance sensor arranged on a front side of the vehicle at a predetermined angle to a vehicle longitudinal axis and configured to emit at least one first laser beam in a direction of a first measuring point in front of the vehicle at least at the first point in time and the second point in time, and
at least one laser beam length sensor that is configured to ascertain the length of the at least one laser beam and at least one associated vector of the laser beam at each of the at least first point in time and second point in time, and at least one detection device that is configured to ascertain a differential vector from the motion vector and each of the ascertained vectors of the laser beam and to form a gradient signal representing a gradient approximated by the differential vector.

2. The arrangement according to claim 1, wherein the first laser distance sensor is configured to emit two laser beams spread in the vehicle longitudinal axis and the vehicle transverse direction at least at the first point in time and the second point in time in such a way that one of the spread laser beams is the first laser beam and is emitted in the direction of the first measuring point, and the second of the spread laser beams is emitted in the direction of a further measuring point remote from the first measuring point.

3. The arrangement according to claim 2, wherein the emission of the two laser beams is configured to be performed by sequential switching comprising rotating the laser distance sensor or switching the optical unit of the laser distance sensor.

4. The arrangement according to claim 1, with one second laser distance sensor arranged on a front side of the vehicle inclined at a predetermined angle to the vehicle longitudinal axis, which is configured to direct at least one second laser beam onto a second measuring point in front of the vehicle at least at the first point in time and the second point in time, wherein the at least one laser beam length sensor is further configured to ascertain the length of the laser beam of both laser distance sensors and at least one associated vector of the laser beams, respectively, and wherein the at least one determination device is further configured to ascertain a differential vector from the motion vector and the ascertained vectors of the laser beams and to form the gradient signal therefrom.

5. The arrangement according to claim 4, wherein the first laser beam distance sensor and the second laser distance sensor are arranged next to one another in the transverse vehicle direction.

6. The arrangement according to claim 1, wherein the arrangement further has a further processing device configured to further process the gradient signal, wherein the further processing is carried out by sending the gradient signal to a control device provided in the vehicle, which is configured to further process the gradient signal and to carry out an adaptation of the dynamic parameters based on the received and processed gradient signal, or wherein the further processing takes place by sending the gradient signal to an external processing device which is configured to further process the gradient signal into control signals and to transmit back to the further processing device in the vehicle for performing the adaptation of the dynamic parameters of the vehicle.

7. A method for determining a gradient signal in a vehicle comprising:

in a first step, determining a position of the vehicle in an absolute system at least at a first point in time and at a second point in time and ascertaining a traveled distance as a motion vector therefrom; and in a second step, determining a differential vector from the motion vector and vectors of the laser beam ascertained at the first point in time and the second point in time of at least one first laser distance sensor arranged on a front side of the vehicle at a predetermined angle to a vehicle longitudinal axis, the at least one first laser distance sensor emitting at least one first laser beam in a direction of a first measuring point in front of the vehicle at least at the first point in time and the second point in time, and ascertaining a gradient signal representing a gradient approximated by the differential vector.

8. The method according to claim 7, comprising a third step, comprising further processing the ascertained gradient signal.

9. The method according to claim 8, wherein the further processing is performed by:

an internal calculation of a control signal for adapting dynamic parameters of the vehicle and performing the adaptation, or sending the gradient signal for external processing and receiving at least one control signal ascertained from the gradient signal for adapting the dynamic parameters of the vehicle, and performing the adaptation.

10. The method according to claim 9, wherein the further processed gradient signal and/or the control signal are used to digitize a terrain and/or are provided to other vehicles.

\* \* \* \* \*